United States Patent [19]
Gallo

[11] 3,869,004
[45] Mar. 4, 1975

[54] METHOD OF FINE ADJUSTING BALANCES AND BALANCE FOR PERFORMING THIS METHOD

[76] Inventor: Mario Gallo, Kronleinstr. 1, Zurich, Switzerland

[22] Filed: Aug. 22, 1972

[21] Appl. No.: 282,862

[30] Foreign Application Priority Data
Apr. 24, 1972 Switzerland.......................... 6079/72

[52] U.S. Cl..................................... 177/25, 177/1
[51] Int. Cl............................................. G01g 3/14
[58] Field of Search..... 177/DIG. 1, DIG. 2, DIG. 3, 177/1, 25, 50, 70, 201, 207, 210; 235/151.3

[56] References Cited
UNITED STATES PATENTS

| | | | |
|---|---|---|---|
| 3,528,518 | 9/1970 | Mayer.................................. | 177/70 |
| 3,665,169 | 5/1972 | Henderson et al.................... | 177/25 |
| 3,709,309 | 1/1973 | Williams, Jr. et al.......... | 177/DIG. 3 |

Primary Examiner—Richard B. Wilkinson
Assistant Examiner—Vit W. Miska
Attorney, Agent, or Firm—Stevens, Davis, Miller & Mosher

[57] ABSTRACT

The present invention relates to a method of automatically fine adjusting balances comprising a computing instrument and digital display means, wherein the load is determined throughout the measuring range in terms of measuring units that are smaller than the units used for the indication.

The object contemplated by the present invention resides in providing automatic zero adjustment in the zero range, which will permit a uniform degree of resolution for all values and identical load ranges for each value throughout the entire weighing range to be obtained. The automatic adjustment in the zero range relieves the operator of the necessity of doing more than infrequently resetting the coarse adjustment. At the same time manipulations in favour of the operator are practically impossible to carry out.

The proposed method comprises first in each weighing ascertaining whether the measured value determined by the computing instrument is within the zero range and if so deducting 5 measuring units from the measured value, the result replacing a previously stored adjusting factor as a fresh adjusting factor, whereas in the alternative case the stored adjusting factor is deducted from the measured value determined by the computing instrument and the result indicated in multiples of indicating units.

The invention also relates to a balance for performing this method comprising a computing instrument, digital display means, manually operable coarse adjusting means and an automatic fine adjusting means, wherein the measured load is determined by the computing instrument throughout the measuring range in measuring units that are smaller than the units in which the indication is made, characterized in that the smalles digit of the final decimal of the digital display means represents one unit of the indication, that in each measurement an adjusting factor stored in measuring units in a storage device is deducted in a first arithmetic unit preceding the computing instrument and connected to the computing instrument, from the measured value determined in the computing instrument, and that the result is indicated by the digital display means, that the value stored in said storage unit is determined by a second arithmetic unit connected through an AND-gate to the computing instrument and to a zero range circuit in such manner that whenever the measured value is within the zero range five measuring units are deducted from this measured value in said second arithmetic unit and the result used to replace the adjusting factor previously stored in the storage device.

5 Claims, 2 Drawing Figures

METHOD OF FINE ADJUSTING BALANCES AND BALANCE FOR PERFORMING THIS METHOD

The present invention relates to a method of automatically fine adjusting balances comprising a computing instrument and digital display means, wherein the load is determined throughout the measuring range in terms of measuring units that are smaller than the units used for the indication.

Diverse kinds of adjusting means for digitally indicating balances have been proposed. In a first type of balance the resolution provided by the digital display means, i.e. the smallest measured unit, for instance a digital unit $d$, is the same in the zero range as in the remainder of the weighing range of the balance. Such balances do not afford facilities to the operator for effecting a finer adjustment in the zero range. If a no-load weighing is made. i.e. a weighing in which the platform is empty, the displayed indication is zero. The error in relation to optimum adjustment may be $\pm 0.5\ d$.

In a second type of balance the resolution of the digital display in the zero range is finer than in the remainder of the weighing range. However, in such balances it is necessary to repeat the zeroing of the balance at frequent intervals. In order to indicate the state of the balance at which readjustment is necessary a special digital error indication is usually provided. In order to avoid such a special error indication the zero range, i.e. the load range corresponding to zero, could be made smaller than the load range of other values. However, for achieving this result the load ranges of the values $+1$ and $-1$ must be greater than $1\ d$. In fact they may both be $1.25\ d$, the zero range being $0.5\ d$ and the load ranges of the other values $1\ d$ each.

In these two types of balance the digital display is the only reference for zero adjustment. In a third type of balance in which the resolution is the same in the zero as in the entire measuring range, a finer, stepless indication in the zero range serves as a reference for zeroing. This arrangement suffers from the special drawback that the operator may wrongly interpret the double reading by accepting the zero of the digital reading as being "near enough." This enables the zero point to be deliberatly changed in favour of the operator.

The object contemplated by the present invention resides in providing automatic zero adjustment in the zero range, which will permit a uniform degree of resolution for all values and identical load ranges for each value throughout the entire weighing range to be obtained. The automatic adjustment in the zero range relieves the operator of the necessity of doing more than infrequently resetting the coarse adjustment. At the same time manipulations in favour of the operator are practically impossible to carry out.

The proposed method comprises first ascertaining for each weighing whether the measured value determined by the computing instrument is within the zero range and if so deducting 5 measuring units from the measured value, the result replacing a previously stored adjusting factor as a fresh adjusting factor, whereas in the alternative case the stored adjusting factor is deducted from the measured value determined by the computing instrument and the result indicated in multiples of indicating units.

The invention also relates to a balance for performing this method comprising a computing instrument, digital display means, manually operable coarse adjusting means and an automatic fine adjusting means, wherein the measured load is determined by the computing instrument throughout the measuring range in measuring units that are smaller than the units in which the indication is made, characterized in that the smallest digit of the final decimal of the digital display means represents one unit of the indication, that in each measurement an adjusting factor stored in measuring units in a strorage device is deducted in a first arithmetic unit preceding the computing instrument and connected to the computing instrument, from the measured value determined in the computing instrument, and that the result is indicated by the digital display means, that the value stored in said storage unit is determined by a second arithmetic unit connected through an AND-gate to the computing instrument and to a zero range circuit in such manner that whenever the measured value is within the zero range 5 measuring units are deducted from this measured value in said second arithmetic unit and the result used to replace the adjusting factor previously stored in the storage device.

An embodiment of a balance according to the invention is schematically shown in the accompanying drawing. The proposed method will be illustratively hereinafter described with reference to this embodiment.

In the drawing

Figure 1:
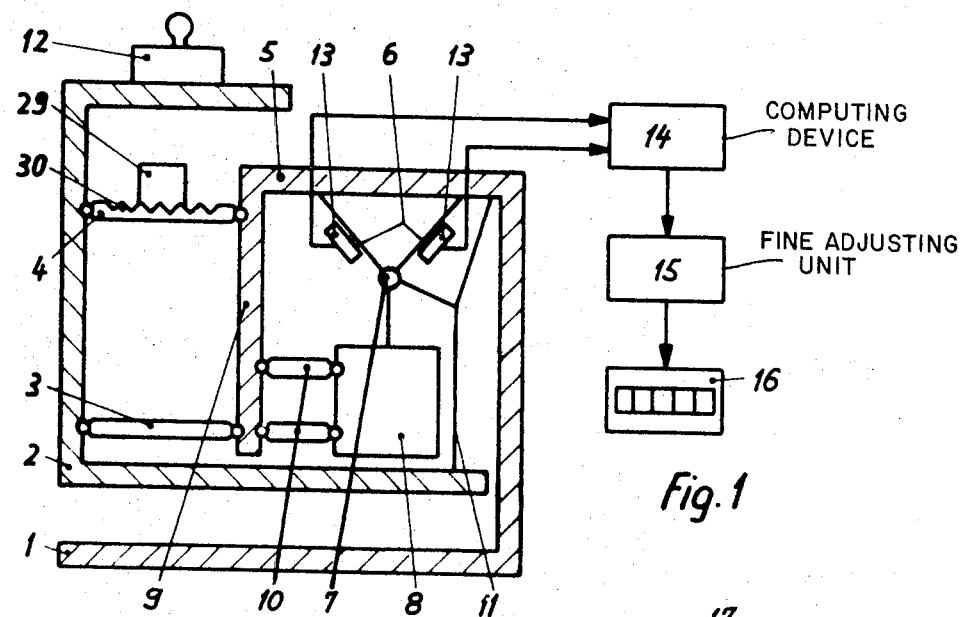
FIG. 1 is the balance in its entirety.

The balance illustrated in FIG. 1 comprises a frame 1 and a platform 2 for the load. This platform 2 is guided by two parallel lever arms 3, 4 pivoted to the frame 1. Two transversely vibrating strings 6 forming a Vee are fastened to a part 5 of the frame 1. The bottom ends of the strings are attached to a body 7. A mass 8 guided vertically parallel to itself by guide arms 10 pivoted to a part 9 of the frame 1 is suspended from the body 7 and thus applies a pre-tension to the two strings 6. The platform 2 is connected by a wire suspension 11 to part 5 of the frame and to the body 7. This known arrangement enables the strings 6 to be equally pre-tensioned by the weight of mass 8 and unequally tensioned or relieved of tension by a force proportional to the mass of the load 12 that is to be measured. Moreover, the frame 1 further carries two transducers 13 which are electrically connected to computing instrument 14. In conventional manner this instrument 14 compares the frequencies of the two strings 6 which are equally loaded by the weight of the known mass 8 and additionally unequally loaded via the wire suspension 11 and the body 7 by the mass of the load 12 that is to be measured. In conventional manner the magnitude of the mass of the load 12 is determined in the computing instrument 14 from the comparison of the two frequencies.

The computing instrument 14 is connected through an interposed fine adjusting unit 15 to digital display means 16 which give a digital reading of the final result of the weighing. The resolution provided by the described balance, i.e. the smallest digital unit of the result obtained from the computing instrument 14, is equal to the unit of measurement $m$ the balance weighs the mass of the load 12 resting on the in multiples of unit $m$. The digital display means 16 are so contrived that the smallest digit in the last decimal 17 of the reading, i.e. one unit $d$ of the indicated reading, corresponds to ten units of measurement $m$. In other words, assuming that the balance measures the load 12 in multiples of 0.1 grams, then the final digit 17 of the reading will indicate integral grammes. The zero range of the balance is understood to be that range within which the balance measures masses between between 0 $m$ and 9 $m$. Within this range the digital display means 16 give no reading because they lack a digit representing 1 $m$. Not until the balance measures 10 $m$, i.e. 1 $d$, will the digital display means 16 give a reading of 1 $d$.

Figure 2:
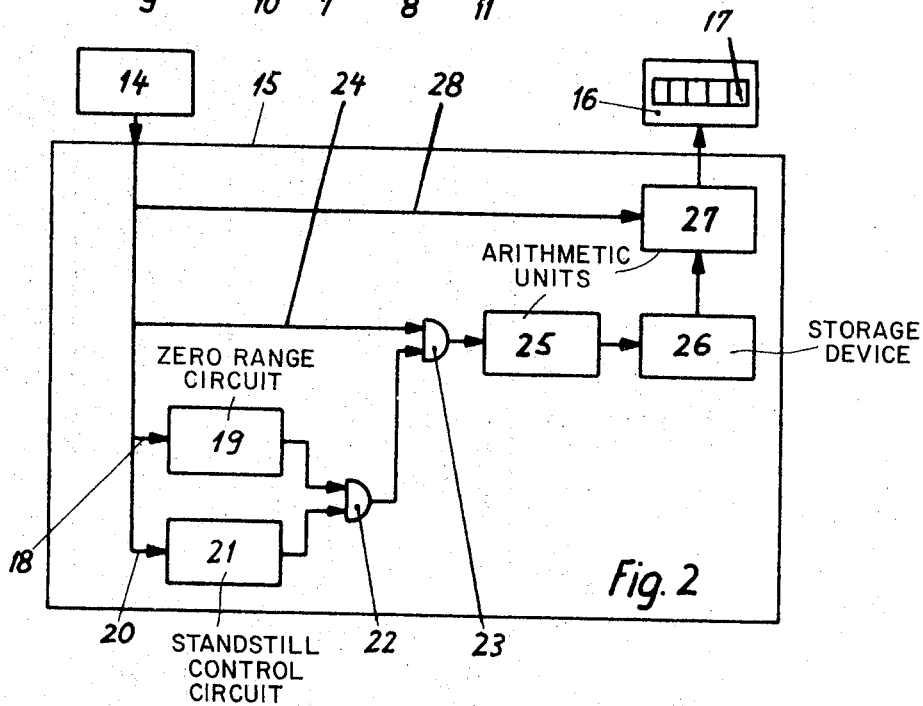
FIG. 2 is the fine adjusting unit.

The fine adjusting unit 15 will be more particularly described with reference to FIG. 2. The computing instrument 14 is connected to the input 18 of a zero range circuit 19 which determines whether or not the load 12 resting on the platform of the balance has a mass within the zero range (i.e. between 0 $m$ and 9 $m$). A further connection leads to the input 20 of a standstill control circuit 21. This circuit prevents weighings from being made until the load 12 is "steady," i.e. until a comparison between consecutive measurements gives an absolute difference less than 1 $m$. The output signals of the two circuits 19 and 21 are applied to an AND-gate 22, and the output of this gate is applied to one input of a second AND-gate 23. The other input 24 of the AND-gate 23 is connected to the output of the computing instrument 14, and the output signal from this further gate is applied to an arithmetic unit 25. This arithmetic unit 25 is connected through an interposed storage device 26 to a second arithmetic unit 27. In the arithmetic unit 25 5 $m$ is a fixed reference value.

In order that the proposed method may be readily understood the possible alternative weighing situations that may arise will be described. Let it be assumed that the balance is switched on but that no load has been placed on the platform 2. Circuit 19 will then ascertain that the measured mass (on the empty platform) is within the zero range. At the same time the standstill control circuit 21 will ascertain that the load is steady. The AND-gates 22 and 23 will therefore be opened and the computing instrument 14 connected to the arithmetic unit 25. If at this instant the balance is an ideal adjustment, a value of 5 $m$, i.e. the mean value of the zero range — will be transmitted as the natural result of the weighing. in the arithmetic unit 25 the fixed value 5 $m$ will be deducted from this result and the output, viz. 0 $m$ stored in the storage unit 26 besides being transmitted to the following arithmetic unit 27.

In this latter arithmetic unit 27 the output 0 $m$ is deducted from the value 5 $m$ which is received via 28 directly and the final result — i.e. 5 $m$ — will be indicated by the digital display 16. Since this result — 5 $m$ — is less than 1 $d$, the final digit 17 will simply be a zero.

If the same weighing is repeated say two hours later it is possible that the balance may have slightly deviated from its former state of true adjustment, due for instance to temperature or other effects. Let it be assumed that a weighing of the empty platform 2 now yields the measured value 8 $m$. The arithmetic unit 25 deducts the fixed value 5 $m$ from this measurement and the result — i.e. 3 $m$ — replaces the previously stored value of 0 $m$ in the storage unit 26. In the second arithmetic unit 27 the stored value 3 $m$ is deducted from the natural result 0.8 $d$ and the final result, i.e. 5 $m$ is transmitted to the digital display means 16. Again the final digit 17 of the reading will simply be a zero.

Now let load having a mass of say 280 $m$ be placed on the platform 2. 288 $m$ will then be applied through 28 to the arithmetic unit 27. The stored value 3 $m$ is deducted from this value 288 $m$ and the corrected value, i.e. 285 $m$ is transmitted to the digital display means 16 which accordingly give the reading 28 $d$. This reading is precisely in the middle of the weighing range of 28 $d$, and therefore corresponds to the precise measurement of a mass of 28 $d$ on a balance correctly adjusted to 5 $m$. Since the input at 24 was not transmitted to the arithmetic unit 25, the value of 3 $m$ remains in the storage unit 26.

The described train of events is repeated for as long as the balance remains in operation. When loads are measured having masses outside the zero range, the value stored in the storage unit 26 is always deducted in the arithmetic unit 27 from the natural result of the measurement. In the case of measurements giving a result within the zero range the measured value is processed in the arithmetic unit 25 as described, and the fresh difference of 5 $m$ replaces the previous difference in the storage unit 26.

Now it is possible for the digital display means 16 to give a 1 $d$ reading when the platform is empty. This would mean that the fine adjustment achieved by the described method is no longer sufficient to keep the natural result of an empty weighing within the zero range. In such a case the balance must be manually corrected by the coarse adjustment schematically indicated at 29. Preferably this coarse adjustment 29 works in steps 30 of 5 $m$. The operator must readjust the coarse adjustment 29 by hand until the indicating instrument 16 reads zero when the platform is empty.

It will be understood from the above explanation that the digital display means 16 function as if an invisible lower order digit followed the final digit at 17. This additional digit is rounded off in steps of 1 $d$, the upper critical point being between 9 $m$ and 10 $m$, 19 $m$ and 20 $m$ and so forth.

Not illustrated and described is the sequence control circuit which coordinates and controls the several events, since this circuit may be of any desired design and is not required for an understanding of the invention.

The illustrated embodiment is a so-called string balance, as described for instance in Swiss patent Specification No. 447 653. However, the described method is also applicable to other types of balance, such as inclination balances for electro-optical, static, parallel readings of the angle of inclination with the aid of a multiple track code disk or for dynamic readings of the angle of inclination with the aid of a single track code disk.

I claim:

1. A method of automatically fine adjusting balances comprising a computing instrument and digital display means, in which the load is determined throughout the measuring range in terms of $m$ measuring units that are smaller than the units $d$ of the digital display means, comprising, for each weighing, the steps of determining whether a measured value by the computing is within a predetermined zero range, if so deducting as many measuring units $m$ from the measured value as correspond to half the multiple of measuring units $m$ as are equal to one display unit $d$, and replacing a previously stored adjusting factor with the result of said deducting step as a fresh adjusting factor, and if not deducting the previously stored adjusting factor from the measured value determined by the computing instrument and indicating the result in multiples of display units $d$.

2. A method according to claim 1, wherein each said display unit $d$ equals ten measuring units $m$.

3. An automatically fine adjusting digitally indicating balance, measuring and computing in measuring units $m$ and indicating in display units $d$ where $d$ is a multiple of $m$, comprising in combination:
 a vibrating string balance with two transversely vibrating strings coupled to a weighing platform and forming a Vee pretensioned by the weight of a mass, where the respective frequencies of said vibrating strings are a function of a load to be measured on the weighing platform;
 two sensors, one coupled to each of said vibrating strings, each providing an electrical A.C. signal, the frequency of which corresponds to the frequency of the associated vibrating string;
 a computing means electrically connected to said sensors for determining in digital form in said measuring units $m$ the load on said weighing platform using the transmitted frequencies of said two vibrating strings as input information to perform said determination;
 a zero range circuit coupled to the output of said computing means to detect whether the number of output pulse falls within a predetermined zero range of measuring units $m$, which zero range consists of as many measuring units less one as are equal to one display unit $d$;
 a standstill control unit for checking whether the load is steady, comprising two counters and coincidence circuitry, the steadiness of the load being ascertained by the comparison of the number of pulses generated by one of said vibrating strings during two consecutive measuring periods, wherein said standstill control circuit generates a signal when the number of pulses measured during each of said consecutive measuring periods are found to coincide;
 a first AND gate, connected to the outputs of said zero range circuit and said standstill control circuit, respectively;
 a second AND gate, connected to the outputs of the computing means and said first AND gate, respectively, wherein said computing means transmits the number of pulses corresponding to an empty weighing platform upon the simultaneous positive findings of said zero range circuit and said standstill control circuit;
 a first arithmetic unit, connected to the output of the second AND gate, for deducting a predetermined number of counts from the number of counts transmitted by said computing means, said predetermined number of counts being equal to half the multiple of measuring units $m$ corresponding to one display unit $d$;
 a storage device, connected to the output of said arithmetic unit, for storing the result of the deduction performed in said first arithmetic unit;
 a second arithmetic unit, connected to the outputs of the computing means and the storage device, respectively, for deducting said result stored in said storage device from the number of counts transmitted by the computing means, corresponding to the load on the weighing platform;
 digital display means connected to the output of said second arithmetic unit, said display means displaying the number of counts divided by the number of measuring units $m$ corresponding to one display unit $d$, transmitted by said second arithmetic unit; and
 a manually operated coarse adjustment means comprising a tare weight shiftable in discrete steps to provide additional coarse adjusting capability when said predetermined range of counts is outside the range of said zero range control circuit when no load is on the weighing platform.

4. A balance according to claim 3, wherein the manually operated coarse adjustment means are adjusted in steps of half as many measuring units $m$ as are equal to one display unit $d$.

5. A balance according to claim 3, wherein one display unit $d$ equals ten measuring units $m$.

* * * * *